US007950799B2

(12) United States Patent
Mills et al.

(10) Patent No.: US 7,950,799 B2
(45) Date of Patent: May 31, 2011

(54) OPTICAL ELEMENTS WITH A GAP BETWEEN TWO LENS MATERIALS

(75) Inventors: Gary D. Mills, Escondido, CA (US); Gomaa Abdelsadek, San Diego, CA (US); Laurence Warden, Poway, CA (US); Jagdish M. Jethmalani, San Diego, CA (US)

(73) Assignee: Ophthonix, Inc., Vista, CA (US)

( * ) Notice: Subject to any disclaimer, the term of this patent is extended or adjusted under 35 U.S.C. 154(b) by 58 days.

(21) Appl. No.: 11/726,058

(22) Filed: Mar. 20, 2007

(65) Prior Publication Data
US 2007/0285617 A1    Dec. 13, 2007

Related U.S. Application Data

(60) Provisional application No. 60/784,394, filed on Mar. 20, 2006.

(51) Int. Cl.
*G02C 7/02* (2006.01)
(52) U.S. Cl. .......................... 351/159; 359/741; 351/177
(58) Field of Classification Search .................. 351/159; 359/741
See application file for complete search history.

(56) References Cited

U.S. PATENT DOCUMENTS

| 3,038,210 A | 6/1962 | Hungerford et al. |
| 3,542,828 A | 11/1970 | Harris |
| 4,682,007 A * | 7/1987 | Hollander ..................... 219/211 |
| 5,028,358 A | 7/1991 | Blum |
| 5,236,970 A | 8/1993 | Christ et al. |
| 5,807,906 A | 9/1998 | Bonvallot et al. |
| 6,049,430 A * | 4/2000 | Heanue et al. ................. 359/642 |
| 6,075,652 A * | 6/2000 | Ono et al. ...................... 359/642 |
| 6,096,159 A | 8/2000 | Ito et al. ........................ 156/344 |
| 6,391,983 B1 | 5/2002 | Bateman et al. |
| 6,450,642 B1 | 9/2002 | Jethmalani et al. |
| 6,560,025 B2 | 5/2003 | Tabata et al. ................... 359/624 |
| 6,712,466 B2 | 3/2004 | Dreher |
| 6,786,602 B2 | 9/2004 | Abitbol |
| 6,813,082 B2 | 11/2004 | Bruns |
| 6,840,619 B2 | 1/2005 | Dreher |
| 6,942,339 B2 | 9/2005 | Dreher |
| 6,953,381 B2 | 10/2005 | Siders et al. |
| 6,989,938 B2 | 1/2006 | Bruns |
| 7,021,764 B2 | 4/2006 | Dreher |
| 7,218,811 B2 | 5/2007 | Shigenaga et al. .............. 385/33 |
| 2002/0080464 A1 | 6/2002 | Bruns |

(Continued)

FOREIGN PATENT DOCUMENTS
GB    2 108 358    5/1983
(Continued)

OTHER PUBLICATIONS

Machine Translation of JP2001-350014 Dec. 2001.
Database WPI, Week 198631, accession No. 1986-199901 (1986).
Database WPI, Week 198821, accession No. 1988-142600 (1988).
(Continued)

*Primary Examiner* — Jessica T Stultz
(74) *Attorney, Agent, or Firm* — Morrison & Foerster LLP

(57) ABSTRACT

The present invention provides an ophthalmic lens comprised of two lens materials with a gap between them of less than about 5 mm. The gap is formed and maintained by particles on the perimeter of the surfaces of both lens materials. Methods are also provided for creating a gap between two lens materials and for producing an ophthalmic lens with a gap between two lens materials.

43 Claims, 1 Drawing Sheet

U.S. PATENT DOCUMENTS

| | | | |
|---|---|---|---|
| 2003/0003295 A1* | 1/2003 | Dreher et al. | 428/332 |
| 2003/0143391 A1 | 7/2003 | Lai | |
| 2004/0008319 A1 | 1/2004 | Lai et al. | |
| 2004/0160574 A1* | 8/2004 | Dreher | 351/159 |
| 2004/0218117 A1 | 11/2004 | Matsuoka et al. | |
| 2004/0235974 A1 | 11/2004 | Lai | |
| 2005/0007000 A1* | 1/2005 | Chou et al. | 313/116 |
| 2005/0104240 A1 | 5/2005 | Jethmalani et al. | |
| 2005/0126697 A1 | 6/2005 | Kuczynski | |
| 2006/0050228 A1 | 3/2006 | Lai et al. | |
| 2006/0052547 A1 | 3/2006 | Jethmalani et al. | |

FOREIGN PATENT DOCUMENTS

| | | |
|---|---|---|
| JP | 2001350014 A | 12/2001 |
| WO | WO-2006/029264 | 3/2006 |

OTHER PUBLICATIONS

Database WPI, Week 200219, accession No. 2002-142501 (2001).
Database WPI, Week 200617, accession No. 2006-160555 (2006).
International Preliminary Report on Patentability for PCT/US2007/006972, mailed Oct. 2, 2008, 6 pages.
International Preliminary Report on Patentability for PCT/US2007/006992, mailed Oct. 2, 2008, 6 pages.
International Search Report and Written Opinion for PCT/US2007/006972, mailed Aug. 19, 2008, 9 pages.
Jacobine, A. F. (1993). "Thiol-Ene Photopolymers," In *Radiation Curing in Polymer Science and Technology*. J.P. Fouassier et al. eds., Elsevier Applied Science: Essex, England, 3:219-268.
Shimomura, Journal of Polymer Science: Part A: Polymer Chemistry (1999) 37:127-128.
Non-Final Office Action for U.S. Appl. No. 11/726,055, mailed on Apr. 6, 2009, 7 pages.

\* cited by examiner

OPTICAL ELEMENTS WITH A GAP BETWEEN TWO LENS MATERIALS

CROSS-REFERENCE TO A RELATED APPLICATION

This application claims the benefit of U.S. provisional application Ser. No. 60/784,394, filed Mar. 20, 2006, which is hereby incorporated, in its entirety.

FIELD OF THE INVENTION

The present invention relates to new and improved optical elements such as ophthalmic lenses.

BACKGROUND OF THE INVENTION

Ophthalmic lenses are worn by many people to correct vision problems. Vision problems are caused by aberrations of the light rays entering the eyes. These include low order aberrations, such as myopia, hyperopia, and astigmatism, and high order aberrations, such as spherical, coma, trefoil, and chromatic aberrations. Because the distortion introduced by aberrations into an optical system significantly degrades the quality of the images on the image plane of such system, there are advantages to the reduction of those aberrations.

Ophthalmic lenses are typically made by writing prescriptions to lens blanks. This is accomplished by altering the topography of the surface of a lens blank, as described in the background section of U.S. Pat. No. 6,953,381 to Siders et al. This is not an effective way to correct high order aberrations, though. Wavefront aberrators can be used to help correct such high order aberrations.

U.S. Pat. No. 6,989,938 (the '938 patent) and U.S. Pat. No. 6,813,082, each to Bruns, describe wavefront aberrators and methods for manufacturing the same. The '938 patent describes how a unique refractive index profile can be created in a monomer layer by controlling the extent of curing of the monomer in different regions across the surface, thus creating a wavefront aberrator. The '938 patent further describes a method that allows one to achieve a unique refractive index profile through the creation of regions with varying degrees of cure. Additionally, the PCT application with the Publication Number WO 2006/029264 describes in more detail materials that may be used to correct high order aberrations.

Wavefront aberrators that correct for both low order and high order aberrations are known. These aberrators contain a polymer layer wherein the polymer layer can be programmed by curing to have a variable index of refraction profile or a constant index of refraction throughout the aberrator. See for example the following U.S. Pat. Nos. 6,813,082; 6,989,938; 6,712,466; 6,840,619; 6,942,339 and 7,021,764 all of which are incorporated herein by reference.

Thus, methods for easily using certain curable materials in conjunction with lens materials would be advantageous. One such method would be to provide a gap between two lens materials where a curable resin could be injected. Additionally, an ophthalmic lens that makes use of such methods would also be beneficial.

SUMMARY OF THE INVENTION

The present invention provides an optical element, such as an ophthalmic lens, comprised of two lens materials. The lens materials have a gap between them wherein a curable resin may be injected into the gap. Preferably, the gap is less than about 1 millimeter and is formed by particles adhered to the surfaces of the lens materials.

The subject invention also provides methods for creating a gap between two lens materials. In a specific embodiment, the gap is formed by adhering particles to the surfaces of the lens materials. When the lens materials are placed one on top of the other, a gap is formed by the particles.

The present invention further provides a method for producing an ophthalmic lens with a gap between two lens materials. A curable resin is then injected into the gap and then cured to have either a specific or a variable index of refraction.

By making use of a gap between the lens materials, a curable resin that is capable of having a varying index of refraction can be injected into the gap. This facilitates the correction of high order vision aberrations.

Additionally, the present invention relates to an adhesive formulation that contains particles wherein the adhesive formulation is used to a gap between two lenses. Preferably the adhesive is an optical adhesive and the beads are polystyrene beads.

DETAILED DISCLOSURE

Figure 2:
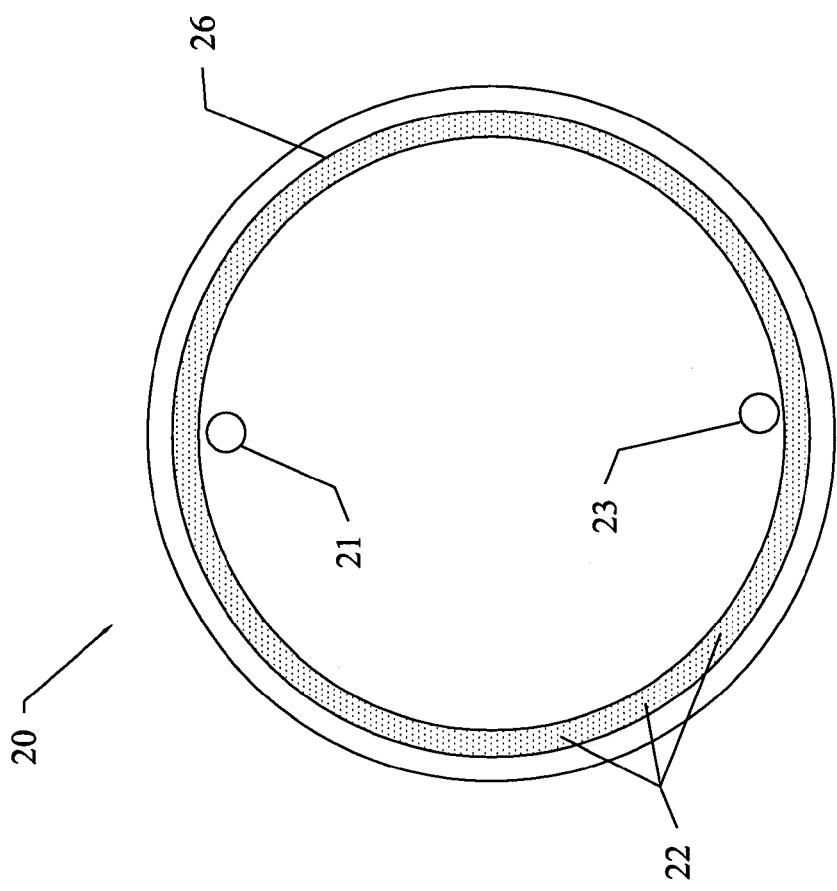
FIG. 2 shows a top view of a lens assembly 20 according to the present invention. The lens assembly 20 is comprised of two lenses stacked on top of each other bonded by an optical adhesive layer 26 which forms a complete adhesive ring around the perimeter of the lens.

The present invention provides an ophthalmic lens capable of having a curable resin injected in between two lens materials. A method for making such an ophthalmic lens is also provided.

In an embodiment specifically exemplified herein, a gap is formed between two lens materials by adhering particles to the surfaces of the lens materials. When the lens materials are compressed and bonded together, the particles form a gap of less than about 5 millimeters (mm) and preferably less than about 1 mm.

The term "ophthalmic lens" is used herein in its usual sense and encompasses any lens used to correct vision problems, including lenses comprised of one or more lens materials.

The term "perimeter" is used herein in its usual sense and, when referring to the surface of a lens material refers to the outer edge of the lens which is outside the area which will be cut for placement into an eyeglass frame. Usually this includes the outer about 20%, preferably about 10%, of the surface, diametrically, all the way around the outer edge of the lens material surface.

The term "cap," when referring to a lens material, is used herein in its usual sense and, for a lens comprised of two lens materials, includes the lens material that will be farther away from the eye when worn by a person.

The term "base," when referring to a lens material, is used herein in its usual sense and, for a lens comprised of two lens materials, includes the lens material that will be closer to the eye when worn by a person.

The term "bead" is used herein to refer to a particle that is generally spherical in shape.

In practicing the present invention particles are positioned between two lenses to form a gap between the lenses when they are bonded together at the periphery of the lenses. The size of the particles is dictated by the desired size of the gap. A curable material (resin) is injected into the gap to form a curable layer that is cured to form a refractive index profile across the lens. The refractive index profile can be variable or it can be constant.

The curable layer is injected into the gap formed between the lenses as a liquid composition containing monomers, initiators, stabilizers, dyes, initiation inhibitors and the like. The exact composition of the lens materials and monomer/polymer composition is not critical to the practice of the present invention.

Adhesives useful in the practice of the present invention include optical adhesives which are well known to one of ordinary skill in the art. Preferably, UV curable optical adhesives are employed and can be purchased from Norland Products, Inc. of Cranbury, N.J. USA. A preferred optical adhesive is a 100% solids, UV curable optical adhesive such as Norland NOA 61 and NOA 65. The viscosity of the adhesive can vary and is usually determined by personal preference and handling conditions in the manufacture of the optical element. Viscosities of from about 1,000 to 120,000 centipoise (cP) can be utilized.

The specific composition and shape of the particles used is also not critical to the practice of the present invention. The particles can be rigid or compressible. Suitable particle compositions include plastic, glass, zirconium, titanium, steel, other metals and the like.

Since particles are typically present in a particle size distribution, the particle size distribution should be as tight as practicable with oversize particles preferably eliminated. As an example, when polystyrene beads are employed as the particles and the desired gap between the 2 lenses is 0.5 mm then the polystyrene beads can be passed though 0.6 mm sieve to separate oversized particles and also through a 0.5 mm sieve to separate undersized particles. This particle size distribution works well with polystyrene beads. The particles can be mixed into an optical adhesive using routine mixing techniques.

When bonding or gluing the two lenses together to form the gap there between, there needs to be an entrance site on one of the lenses to allow the injection of the curable material into the gap to form the curable layer. There is also preferably an exit site for release of the air present in the gap. Entrance and exit sites can be made by drilling a hole in either lens (base or cap) preferably at opposite sides of the lens close to the bonding area and in the perimeter of the lens. A preferred manner of providing entrance and exit sites is to leave a gap in the bonding of the perimeter of the lenses. In this preferred embodiment, the gap is large enough to allow a needle to be inserted to inject the curable material and to also allow escape of air. Preferably, the entrance and exit sites are generally on opposite sides of the lens about 180 degrees apart, ie, 12 o'clock/6 o'clock configuration.

Once the curable material is injected into the gap to form the curable layer the lens can then be heated to partially cure specific monomers to form a gel. Additionally, in the case of UV setting optical adhesives, it is preferred to cure the entrance and exit sites with UV light immediately after injection of the curable material to prevent any leakage from the filled gap. The lenses can then be handled for manufacturing purposes and then fully cured by standard techniques, i.e. heat, UV light, laser light, etc.

Figure 1:
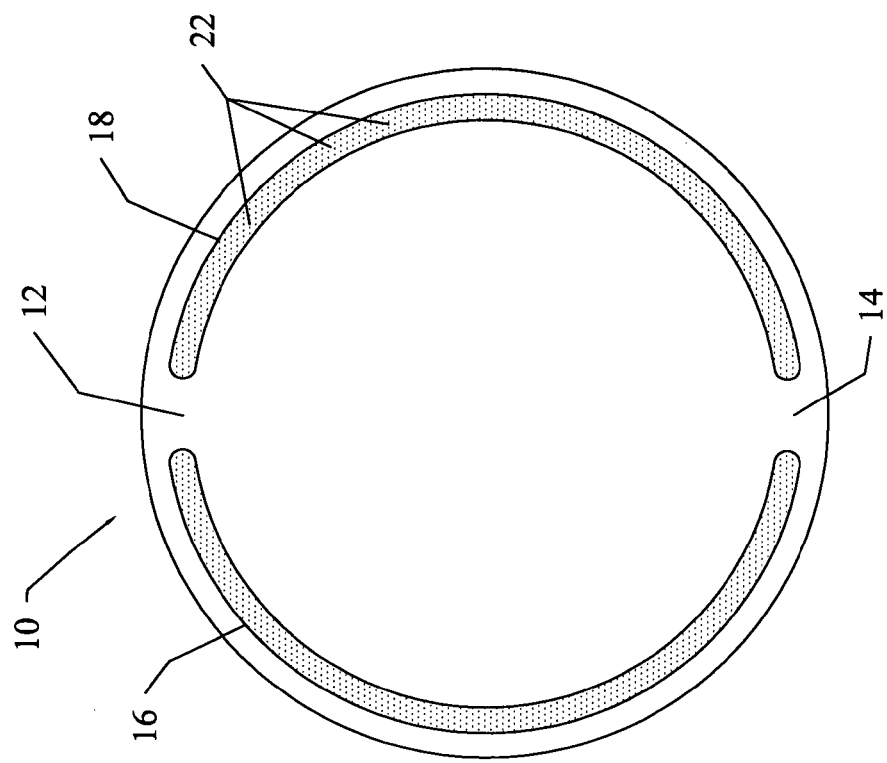
FIG. 1 shows a top view of a lens assembly 10 according to the present invention. The lens assembly 10 is comprised of two lenses stacked on top of each other bonded by two optical adhesive layers 16 and 18. The optical adhesive layer contains particles 22 of a desired size to form a gap between the upper and lower lens.

Shown in FIG. 1 is a top view of a lens assembly 10 according to the present invention. The lens assembly 10 is comprised of two lenses stacked on top of each other bonded by two optical adhesive layers 16 and 18. The optical adhesive layer contains particles 22 of a desired size to form a gap between the upper and lower lens. The absence of adhesive appearing at areas 12 and 14 serve as entrance and exit sites for the liquid curable material and air, respectively. As long as both areas 12 and 14 can accept a needle used to inject the curable material, both can be used interchangeably, ie, injection of curable material or escape of air.

FIG. 2 is a top view of a lens assembly 20 according to the present invention. The lens assembly 20 is comprised of two lenses stacked on top of each other bonded by an optical adhesive layer 26 which forms a complete adhesive ring around the perimeter of the lens. The optical adhesive layer contains particles 22 of a desired size to form a gap between the upper and lower lens. Holes 21 and 23 drilled into either lens (base or cap) serve as entrance and exit sites for the liquid curable material and air, respectively. As long as both holes 21 and 23 can accept a needle used to inject the curable material, both can be used interchangeably, i.e., injection of curable material or escape of air.

In a preferred embodiment, the particles are adhered to the perimeter of the surfaces of the lens materials. Also in a preferred embodiment, the particles are rigid and comprise a polymeric material, such as polystyrene. In another embodiment of the current invention, the particles are made of glass. In various embodiments of the present invention, the particles may be spherical or irregularly shaped. Preferably, the particles are spherical and have a tight uniform size distribution. In a further embodiment, the particles may be compressible.

In one embodiment, the particles are provided as part of a glue preferably an optical adhesive. The glue may be UV curable.

In a specific embodiment, the gap size provided by the particles is about 0.5 millimeters.

In a specific embodiment, one of the lens materials is a base lens blank while the other lens material is a cap lens blank.

Additionally, the lens materials may each be made of glass, plastic, or combinations thereof. Lens materials include but are not limited to polycarbonate, CR-39, 1.6 index plastic, 1.67 index plastic, 1.74 index plastic and 1.76 index plastic. Preferably, the lens material is a 1.6 index plastic lens.

In yet a further embodiment, a curable resin is injected into the gap that is formed by the particles between the lens materials. The resin can then be cured to have a specific refractive index or a variable refractive index. Additionally, the resin may be cured in a pattern to offset or cancel wavefront aberrations of the eye in order to correct higher order vision aberrations.

In another embodiment of the present invention, the particles are dispensed as part of a glue onto the lens material surfaces. Then, the glue is photocured to solidify the position of the particles.

All patents, patent applications, provisional applications, and publications referred to or cited herein are incorporated by reference in their entirety, including all figures and tables, to the extent they are not inconsistent with the explicit teachings of this specification.

The following example illustrates how a UV curable glue containing 500 μm diameter polystyrene beads can be used to create a gap between two lens materials. The example further shows how a curable resin can be made to be injected into the gap and how the lens would be completed. The example is for descriptive purposes only and should not be construed as limiting.

EXAMPLE 1

In a clean vial, about 5.3 g of Poly[(phenylglycidyl ether)-co-formaldehyde] (D.E.N. 438), about 2.6 g of Diallylether Bisphenol A, about 6.8 g of Trimethylolpropane tris(3-mercaptopropionate), about 0.015 g of 1-Hydroxy-cyclohexyl-phenyl-ketone (Irgacure 184), about 0.15 g of Tetrabutylammonium bromide, and about 0.003 g of N-nitrosophenylhydroxylamine aluminum salt (N-PAL) were weighed, mixed on a magnetic stirrer at about 70° C. (water bath) for about 10 minutes, and named as Part I.

In another clean vial, about 6 g of Trimethylolpropane tris(3-mercaptopropionate), about 2.4 g of Diallylether Bisphenol A, about 4 g of Di(ethylene glycol)bis(allyl carbonate), about 0.003 g of N-PAL, and about 0.02 g of Benzophenone were weighed, mixed on a magnetic stirrer at about 70° C. (water bath) for about 10 minutes, and named as Part II.

Part I and Part II were mixed well and degassed to create a curable resin. Two lens blanks, base and cap, were bonded to each other (lens assembly) through a UV curable glue containing polystyrene beads with about 500 μm diameter. The glue with beads was dispensed close to the edge of the cap, covered by the base, and photocured to give a space of about 500 μm for injecting the curable resin into it. Two gaps were left on opposite ends of the lens assembly to allow for injection of the curable resin and to allow air in the gap to escape. The curable resin was then injected into the 0.5 mm gap to form a layer of curable resin. The lens assembly was then transferred into an oven with well-controlled temperature and heated for about 6.5 hours at about 75° C. whereupon the curable resin formed a gel. The lens assembly was then transferred to the lens machine room to be grinded and polished to the desired thickness. The curable resin layer was then fully cured. The resulting ophthalmic lens was cut, grinded, polished, and placed in an eyeglass frame.

EXAMPLE 2

Viscosity Evaluations for Photocurable Epoxy Based Adhesive Formulations

The following materials were used in Examples 2 and 3. Commerical sources are listed where applicable:
Materials:
Epo #7 is Bis[4-(glycidyloxy)phenyl]metane or (Bisphenol F diglycidyl ether), Aldrich
DEN 438 is Poly[(phenylglycidyl ether)-co-formaldehyde], DOW
UVI-6976 is Cyracure™ Photoinitiator UVI-6976, DOW
UVI-6992 is Cyracure™ Photoinitiator UVI-6992, DOW
Epoxy, OG-169 is a single component epoxy, Epo-tek
Triton X-100 is a polyethylene glycol p-(1,1,3,3-tetramethylbutyl)-phenyl ether(nonionic surfactant).
Epoxy OG-125 is a single component epoxy, Epo-tek.
Epo #4 is 1,1,1-tris(p-hydroxyphenyl)ethane triglycidyl ether (THPE-GE),
Ene #27 is Ebecryl 1290 (aliphatic urethane hexaacrylate), from UCB Chemicals,
Viscosity=85,000 cP @ 25 0 C
BPAEDA is bisphenol A ethoxylate (4EO/Ph) diacrylate
BPh is benzophenone
DMOPAcP is 2,2-dimethoxy-2-phenylacetophenone
4-MP is 4-methoxyphenol
BXI-100 is polyallyl glycidyl ether oligomer, that promotes free radical curing. When it is combined with a UV cure formulation, it provides a dual cure mechanism by producing free radicals.
N-BMAA is N-butoxymethylacrylamide
IBMA is isobornylmethacrylate
AA is acrylic acid
4-AS is 4-acetoxystyrene
DUDMA is diurethanedimethacrylate
N,N-DMAA is N,N-dimethylacrylamide
GMA is glycidylmethacrylate
Ene #58 is bisphenol A glycerolate (1 glycerol/phenol) diacrylate, visc.=1,000,000 cPs
Ene #11 is bisphenol A ethoxylate (2 Et/phenol) dimethacrylated, visc.=815 cPs
Ene #20 is pentaerythritol triacrylate (PETA), tech
Ene #59 is Tris[(4-vinyloxy)butyl]trimellitate (VEctomer® 5015 vinyl ether)
VEctomer® 2032 vinyl ether is an aromatic urethane divinyl ether oligomer
Ene #28 is Ebecryl 220 and is an aromatic urethane hexaacrylate, visc.=28,268 cPs
Ene #25 is dipentaerythritol hydroxy pentacrylate (DPHPA), visc.=15,855 cPs
Ene #1 is diallylether Bisphenol A, visc.=58 cPs
Ene #5 is triallyl triazine trione, visc.=170 cPs
Thiol #19 is pentaerythritol tetrakis(3-mercaptopropionate), visc.=490 cPs
NOA-65 is Norland Optical Adhesive, Norland Products Inc.

The following ingredients listed in Tables 1, 2 and 3 were weighed in a clean amber vial and mixed with a magnetic stirrer at 85° C. for 10 minutes to form a UV curable adhesive. A film was generated on a 1.6 index ophthalmic lens by UV curing under an EXFO light at full power for the times set forth in the tables. The viscosity of the formulations before curing ranged from 2,500-17,900 cP. The film was evaluated for adhesion to the substrate.

TABLE 1

| Formulation A | Epoxy, OG-169 | Triton X-100 | Epoxy OG-125 | Epo #4 | UVI-6992 | Total | Viscosity | Curing Time | Adhesion |
| --- | --- | --- | --- | --- | --- | --- | --- | --- | --- |
| Actual % | 68.66 | 1.99 | 9.47 | 14.51 | 3.79 | 100.00 | 17,900 cP | 50 sec | Excellent |

TABLE 2

| B | Epo#7 | DEN-438 | UVR-6000 | UVI-6976 | UVI-6992 | Total | Viscosity | Curing Time | Adhesion |
| --- | --- | --- | --- | --- | --- | --- | --- | --- | --- |
| Actual % | 48.85 | 39.40 | 5.24 | 1.61 | 4.90 | 100.00 | 2500 cP | 15 sec | Excellent |

TABLE 3

| C | Epo#7 | DEN-438 | UVR-6000 | UVI-6976 | Total | Viscosity | Curing Time | Adhesion |
|---|---|---|---|---|---|---|---|---|
| Actual % | 18.80 | 61.54 | 17.95 | 1.71 | 100.00 | 3000 cP | 15-30 sec | Excellent |

A high speed mixer was used to mix Formulation B (10.2000 g) above with polystyrene beads (0.1550 g) that were sieved through a 600 micron sieve to remove oversized beads and then through a 500 micron sieve to remove undersized beads. The weight percent of beads was 1.5%. This formulation was used to bond a base and cap of 1.6 index lens material together. The adhesive was cured with UV light.

EXAMPLE 3

Viscosity Evaluations for Photocurable Ene-Thiol Based Adhesive Formulations The following ingredients listed in Tables 4-10 were weighed in a clean amber vial and mixed with a magnetic stirrer at 85° C. for 10 minutes to form a UV curable adhesive. A film was generated on a 1.6 index ophthalmic lens by UV curing under an EXFO light at full power for the times set forth in the tables. The viscosity of the formulations before curing ranged from 3,421-120,000 cP. The film was evaluated for adhesion to the substrate.

TABLE 4

| G-280 | Thiol #19 | Irga 184 | NOA-65 | N-PAL | Ene #27 | MEHQ | DMOPAcP | BP | Total | Viscosity | Curing Time | Adhesion |
|---|---|---|---|---|---|---|---|---|---|---|---|---|
| Actual % | 30.54 | 1.17 | 25.00 | 0.79 | 41.67 | 0.67 | 0.08 | 0.08 | 100.00 | 3500 cP | 60 sec | Excellent |

TABLE 5

| G-297 | Ene #27 | Thiol #19 | BPh | DMOPAcP | Irga 184 | 4-MP | N-PAL | Total | Viscosity | Curing Time | Adhesion |
|---|---|---|---|---|---|---|---|---|---|---|---|
| Actual % | 58.72 | 40.73 | 0.11 | 0.10 | 0.10 | 0.16 | 0.08 | 100.00 | 3800 cP | 3 sec | Excellent |

TABLE 6

| G-298 | Ene #27 | Thiol #19 | BPh | DMOPAcP | Irga 184 | 4-MP | N-PAL | BPAEDA | BXI-100 | Total | Viscosity | Curing Time | Adhesion |
|---|---|---|---|---|---|---|---|---|---|---|---|---|---|
| Actual % | 49.73 | 41.78 | 0.07 | 0.19 | 0.07 | 0.06 | 0.03 | 7.21 | 0.86 | 100.00 | 3421 cP | 3 sec | Excellent |

TABLE 7

| GT | Ene #58 | N-BMAA | Ene #25 | 4-MP | Irga 651 | AA | Ene #1 | Thiol #27 | Ene #28 | N-PAL | GMA | Ene #5 | Ene #11 | Total | Viscosity | Curing Time | Adhesion |
|---|---|---|---|---|---|---|---|---|---|---|---|---|---|---|---|---|---|
| Actual % | 10.03 | 2.81 | 10.46 | 0.05 | 0.77 | 2.58 | 5.50 | 40.54 | 15.64 | 0.17 | 3.07 | 5.51 | 2.88 | 100.00 | 5000-6000 cP | <10 sec | Excellent |

TABLE 8

| GU | Ene #58 | N-BMAA | Ene #25 | 4-MP | Irga 651 | AA | Ene #1 | Thiol #27 | Ene #28 | N-PAL | GMA | Ene #5 | Ene #11 | Total | Viscosity | Curing Time | Adhesion |
|---|---|---|---|---|---|---|---|---|---|---|---|---|---|---|---|---|---|
| Actual % | 17.18 | 2.32 | 10.52 | 0.06 | 1.13 | 2.69 | 5.26 | 37.75 | 13.10 | 0.23 | 3.31 | 6.46 | 0.00 | 100.00 | 42,600 cP | 10 sec | Excellent |

TABLE 9

| GX | Ene #58 | N-BMAA | Ene #25 | 4-MP | Irga 651 | AA | Ene #1 | Thiol #19 | Ene #28 | N-PAL | GMA | Ene #5 | Ene #27 | Total | Viscosity | Curing Time | Adhesion |
|---|---|---|---|---|---|---|---|---|---|---|---|---|---|---|---|---|---|
| Actual % | 57.31 | 0.57 | 2.94 | 0.13 | 1.26 | 0.66 | 0.00 | 8.60 | 11.49 | 0.20 | 0.59 | 0.65 | 15.58 | 100.00 | 120,000 cP | <10 sec | Excellent |

TABLE 10

| GV-III | Ene #58 | N-BMAA | Ene #25 | 4-MP | Irga 651 | AA | Thiol #19 | Ene #28 | N-PAL | GMA | Ene #5 | Total | Viscosity | Curing Time | Adhesion |
|---|---|---|---|---|---|---|---|---|---|---|---|---|---|---|---|
| Actual % | 39.06 | 1.08 | 0.00 | 0.07 | 1.05 | 1.76 | 36.54 | 18.55 | 0.17 | 1.73 | 0.00 | 100.00 | 20,000 cP | <10 sec | Excellent |

A high speed mixer is used to mix the above adhesive formulations with polystyrene beads (1.5 wt %) that were sieved through a 600 micron sieve to remove oversized beads and then through a 500 micron sieve to remove undersized beads. These formulations are used to bond a base and cap of 1.6 index lens material together. The adhesive is cured with UV light.

EXAMPLE 4

Norland Adhesive with polystyrene Beads

Norland optical adhesive NOA-61 was mixed in a high speed mixer with 1.5 wt % polystyrene beads that were sieved through a 600 micron sieve to remove oversized beads and then through a 500 micron sieve to remove undersized beads. This adhesive formulation was used to bond a cap and base of 1.6 index lens material resulting in a gap of about 0.5 mm between the base and cap.

Norland optical adhesive NOA-65 was mixed in a high speed mixer with 1.5 wt % polystyrene beads that were sieved through a 600 micron sieve to remove oversized beads and then through a 500 micron sieve to remove undersized beads. This adhesive formulation was used to bond a cap and base of 1.6 index lens material resulting in a gap of about 0.5 mm between the base and cap.

It should be understood that the embodiments described herein are for illustrative purposes only and that various modifications or changes in light thereof will be suggested to persons skilled in the art and are to be included within the spirit and purview of this application.

We claim:

1. An optical element comprising:
   a) a first lens material adhered to a second lens material, wherein at least one of the first and second lens material comprises an ophthalmic lens, wherein the ophthalmic lens comprises a lens configured to correct vision problems; and
   b) particles positioned between said first lens material and said second lens material to form a gap between said first lens material and said second lens material, wherein the particles have been preselected to have substantially the same diameter for defining the gap between the first lens material and the second lens material corresponding to said diameter, and wherein the gap is configured to receive a curable resin after the first and second lenses are adhered together.

2. The optical element of claim 1, wherein said particles are only positioned on the perimeter of said first lens material and said second lens material, wherein the perimeter is the outer 20% of the lens surface.

3. The optical element of claim 1, wherein said gap is less than about 5 millimeters, which corresponds to the diameter of the particles.

4. The optical element of claim 1, wherein said gap is about 0.5 millimeters, which corresponds to the diameter of the particles.

5. The optical element of claim 1, wherein said particles are spherical.

6. The optical element of claim 1, wherein said particles comprise a polymeric material.

7. The optical element of claim 6, wherein said polymeric material is polystyrene.

8. The optical element of claim 1 wherein the particles are formulated in an adhesive.

9. The optical element of claim 8, wherein said adhesive is a UV curable optical adhesive.

10. The optical element of claim 1, wherein said particles are rigid.

11. The optical element of claim 9, wherein the UV curable optical adhesive comprises at least one opening configured to receive curable resin.

12. The optical element of claim 1, further comprising a curable resin that fills said gap between said first lens material and said second lens material.

13. The optical element of claim 12, wherein said curable resin has been cured to have a variable refractive index.

14. The optical element of claim 1, wherein the first lens material and second lens material are ophthalmic lens materials selected from the group consisting of glass, polycarbonate, CR-39 plastic, 1.6 index plastic, 1.67 index plastic, 1.74 index plastic and 1.76 index plastic.

15. A method of providing a gap between two lens materials, wherein at least one of the two lens material comprises an ophthalmic lens, wherein the ophthalmic lens comprises a lens configured to correct vision problems, the method comprising:
preselecting particles to have substantially the same diameter;
adhering said particles to said lens materials, wherein said particles adhere to each lens material surface when said lens materials are compressed together, wherein said particles create a gap between said two lens materials corresponding to said diameter, and wherein the gap is configured to receive a curable resin after the first and second lenses are adhered together.

16. The method according to claim 15, wherein said particles adhere only to the perimeter of said each lens material surface.

17. The method according to claim 15, wherein said gap is less than about 5 millimeters.

18. The method according to claim 17, wherein said gap is about 0.5 millimeters.

19. The method according to claim 15, wherein said particles are spherical.

20. The method according to claim 19, wherein said particles comprise a polymeric material.

21. The method according to claim 15, wherein said particles are formulated in an adhesive, wherein said adhesive is a UV curable optical adhesive, and wherein the UV curable optical adhesive comprises at least one opening configured to receive curable resin.

22. The method according to claim 15 wherein said particles are formulated in an adhesive.

23. The method according to claim 22, wherein said adhesive is a UV curable optical adhesive.

24. The method according to claim 15, wherein said particles are rigid.

25. The method according to claim 15, wherein one or more of said lens materials is comprised of ophthalmic lens material selected from the group consisting of glass, polycarbonate, CR-39 plastic, 1.6 index plastic, 1.67 index plastic, 1.74 index plastic and 1.76 index plastic.

26. A method for producing an ophthalmic lens comprising
a) providing two lens materials, wherein at least one of the two lens materials comprises an ophthalmic lens, wherein the ophthalmic lens comprises a lens configured to correct vision problems;
b) preselecting particles to have substantially the same diameter; and
c) adhering said particles to said lens materials; wherein said particles adhere to each lens material surface when said lens materials are compressed together, wherein said particles form a gap between said two lens materials corresponding to said diameter, and wherein the gap is configured to receive a curable resin after the first and second lenses are adhered together.

27. The method according to claim 26, wherein said gap is less than 1 millimeter.

28. The method according to claim 26, wherein said particles are spherical.

29. The method according to claim 26, wherein said particles comprise a polymeric material.

30. The method according to claim 26, wherein said particles are formulated in an adhesive, wherein said adhesive is a UV curable optical adhesive, and wherein the UV curable optical adhesive comprises at least one opening configured to receive curable resin.

31. The method according to claim 26, wherein said particles are formulated in an adhesive.

32. The method according to claim 31, wherein said adhesive is a UV curable optical adhesive.

33. The method according to claim 26, wherein said particles are rigid.

34. The method according to claim 26, wherein one or more of said lens materials is comprised of glass, polycarbonate, CR-39 plastic, 1.6 index plastic, 1.67 index plastic, 1.74 index plastic or 1.76 index plastic.

35. The method according to claim 26, further comprising injecting a curable material in said gap.

36. A formulation to form a gap between two optical elements, wherein at least one of the two optical elements comprises an ophthalmic lens, wherein the ophthalmic lens comprises a lens configured to correct vision problems, the formulation comprising:
a. an adhesive and
b. particles preselected to have substantially the same diameter, wherein the particles are dispersed in said adhesive to allow two optical elements to be bonded together with a gap there between corresponding to said diameter, and wherein the gap is configured to receive a curable resin after the first and second lenses are adhered together.

37. The formulation of claim 36, wherein the adhesive is an optical adhesive and is UV curable.

38. The formulation of claim 37, wherein the UV curable optical adhesive comprises at least one opening configured to receive curable resin.

39. The formulation of claim 38, wherein the particles are large enough to form a gap of 5 mm or less when said adhesive formulation is used to bond together two ophthalmic lenses.

40. The formulation of claim 39, wherein the particles have a size distribution to form a 0.5 mm gap between said two ophthalmic lenses.

41. The formulation of claim 40, wherein the particles are polystyrene beads.

42. The formulation of claim 38, wherein the particles are one or more particles selected from the group consisting of plastic, glass, zirconium, titanium, steel and other metals.

43. The formulation of claim 42, wherein the particles are polystyrene beads.

* * * * *